(12) United States Patent
Villaret et al.

(10) Patent No.: US 7,428,507 B2
(45) Date of Patent: Sep. 23, 2008

(54) SYSTEM AND ARRANGEMENT FOR PROCESSING PAYMENTS FOR PURCHASES THROUGH A PAYMENT SERVER

(75) Inventors: Jean-Marc Villaret, Paris (FR); Kevin Frank Ritschel, San Jose, CA (US); William Stuart Taylor, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1500 days.

(21) Appl. No.: 09/896,576

(22) Filed: Jun. 29, 2001

(65) Prior Publication Data
US 2003/0004797 A1   Jan. 2, 2003

(51) Int. Cl.
*G06Q 40/00* (2006.01)

(52) U.S. Cl. ............................. 705/37; 705/38; 705/36; 705/5

(58) Field of Classification Search ............ 705/37, 705/38, 34, 36, 5, 35; 710/1; 709/100, 203
See application file for complete search history.

(56) References Cited

U.S. PATENT DOCUMENTS

| | | | | |
|---|---|---|---|---|
| 5,220,501 A | * | 6/1993 | Lawlor et al. | 705/40 |
| 5,920,847 A | * | 7/1999 | Kolling et al. | 705/40 |
| 6,252,869 B1 | * | 6/2001 | Silverman | 370/352 |
| 7,013,352 B2 | * | 3/2006 | Garnett | 710/1 |
| 2001/0039535 A1 | * | 11/2001 | Tsiounis et al. | 705/71 |
| 2002/0069166 A1 | * | 6/2002 | Moreau et al. | 705/40 |

OTHER PUBLICATIONS

Wmode Demonstrates "ClearMode" Advanced Wireless Internet Clearinghouse At CTIA Show Business Editors and High-Tech Writers. Business Wire. New York: Mar. 19, 2001 . p. 1.*

* cited by examiner

*Primary Examiner*—Frantzy Poinvil
*Assistant Examiner*—Clement Graham

(57) ABSTRACT

A system and an arrangement that process payment requests received from a number of distinct data communication devices via respective communications channels and consistent with different communications protocols. In an example embodiment, a payment processing system includes a plurality of data communications devices that transmit a plurality of payment requests in connection with purchases via respective communication channels. Each transmitted payment request includes a merchant identification code and a set of customer financial account data. The system further includes a payment server arrangement that receives the payment requests from the data communications devices at the respective channels via a plurality of adapter modules corresponding to each of the communication channels. Each of the adapter modules includes a payment processing application that identifies a financial institution identification code associated with the merchant identification code. The adapter modules interface with a data processing system of the financial institution consistent with a communications protocol associated with the identified financial institution.

15 Claims, 2 Drawing Sheets

SYSTEM AND ARRANGEMENT FOR PROCESSING PAYMENTS FOR PURCHASES THROUGH A PAYMENT SERVER

FIELD OF THE INVENTION

The present invention generally relates to Electronic Funds Transaction Point of Sale (EFTPOS) systems, and more particularly to processing payments for purchases through non-conventional terminals and communication devices.

BACKGROUND OF THE INVENTION

Electronic Funds Transaction Point of Sale (EFTPOS) terminals and systems have operated for many years. Most current EFTPOS terminals function in the same manner in that account data are input to the terminal, usually via a magnetic stripe reading device. A display and keypad are usually integrated with the EFTPOS terminal. The consumer is prompted to enter a personal identification number (PIN) associated with a debit card before the account data are sent to a bank or financial institution for payment authorization. Once authorization is received the transaction continues until completion, for example, by receipt of article purchased and the sales receipt.

EFTPOS systems are highly secure systems that are designed to run a limited number of applications using a dial out modem. The modem is linked to servers that are controlled by financial institutions. Only authorized bank personnel are authorized to install or upgrade software applications residing in the EFTPOS terminals. PIN numbers are not stored in the terminals, and tampering with any EFTPOS terminal is automatically detected and payment transactions through the tampered line are immediately suspended.

EFTPOS terminals are usually located adjacent the cash register in merchant locations for conveniently processing payments. Once the data are input to the terminal, the data are sent via a transaction-switching network to the host computer of the customer's bank to obtain bank authorization. The merchant's bank coordinates the settlement of funds from the customer's bank to the merchant's bank.

Consumers that shop frequently on-line or pay their bills on-line try to balance convenience with risk since these transactions have relatively poor security safeguards. Despite the efforts of on-line vendors to improve the security of purchase transactions, the fact that the transactions are being conducted over a public network, such as the Internet, makes it extremely difficult to prevent others from capturing sensitive information as it is being transmitted over the public network. EFTPOS systems, on the other hand, provide a high level of security in processing payments due to controlled communications lines and complex protocols required by financial institutions. However, these transactions are limited to authorization of payments and electronic funds transfers that are not conducted over the Internet or any other public network. Any attempts to make EFTPOS systems more flexible have been deterred due to the number of different protocols that exist (since each financial institution has its own protocol and guidelines) and the requirement of controlling communications to maintain high levels of security. Personal computers do offer the convenience of entering your credit card number for on-line purchases. However, payment security is compromised as a consequence of such convenience.

Further complicating efforts at improving payment processing security over unsecured communications networks is the advent of new marketing channels offering consumers more purchasing opportunities. For instance, products that are offered for sale via a mobile telephone or a PDA (personal digital assistant) require the consumer to call in to the vendor to effect payment. In another example, sales volume of selling products through cable TV shopping programs could be significantly increased if the payment processing for such purchases is streamlined from the current call-in system. Despite the opportunities that vendors have to access consumers in new ways, vendors and consumers must still transact payments through traditional POS terminals or by communicating credit card information through a traditional call-in system.

A method and a system that address the aforementioned problems, as well as other related problems, are therefore desirable.

SUMMARY OF THE INVENTION

The present invention is directed to addressing the above and other needs in connection with offering consumers an alternative for effecting payment for purchases over unsecured communication networks. In one example embodiment, a payment server arrangement facilitates receipt and processing of payment requests from various data communication devices, including POS terminals, without compromising the security of the transaction. Throughout this specification and in the claims, the term "product(s)" is used in reference to both products and services. In addition, the term "merchant" is used in this specification as the party that subscribes for the payment processing service and receives payments. The present invention is exemplified in a number of implementations and applications, some of which are summarized below.

According to one aspect of the invention, a payment processing system includes a plurality of data communications devices that transmit a plurality of payment requests in connection with purchases via respective communication channels. Each transmitted payment request includes a merchant identification code and a set of customer financial account data. The system further includes a payment server arrangement that receives the payment requests from the data communications devices at the respective channels via a plurality of adapter modules corresponding to each of the communication channels. Each of the adapter modules includes a payment processing application that identifies a financial institution identification code associated with the merchant identification code. The adapter modules interface with a data processing system of the financial institution consistent with a communications protocol associated with the identified financial institution.

According to another aspect of the invention, a payment request processing arrangement communicates with a plurality of data communication devices via respective communications channels and with a plurality of data processing systems located at a plurality of financial institutions. The arrangement includes a payment server that is responsive to the plurality of data communications devices and is configured to receive a payment processing request via a first channel at a first adapter module corresponding to a first data communications device. Each payment request includes a merchant identification code and a set of customer financial account data. The first adapter module has a first payment processing application that identifies a financial institution identification code associated with the merchant identification code and interfaces with a data processing system of the financial institution consistent with a communications protocol associated with the identified financial institution.

According to yet another aspect of the invention, a computer-implemented method and system facilitates processing payment requests from a plurality of secured and unsecured data communications devices, wherein each payment request includes a merchant identification code and a set of customer financial data. The method includes providing a plurality of adapter modules, each adapter module configured to interface with one or more of the communications devices via a selected communications channel. The adapter modules receive payment requests from the data communications devices via the communications channels. The financial institutions associated with the merchant identification codes are identified, with each financial institution having an associated data processing system for processing payment requests. The method also includes interfacing with the data processing systems of the financial institutions consistent with payment protocols associated with the financial institutions.

It will be appreciated that various other embodiments are set forth in the Detailed Description and Claims that follow.

BRIEF DESCRIPTION OF THE DRAWINGS

Various aspects and advantages of the invention will become apparent upon review of the following detailed description and upon reference to the drawings in which.

Figure 1:
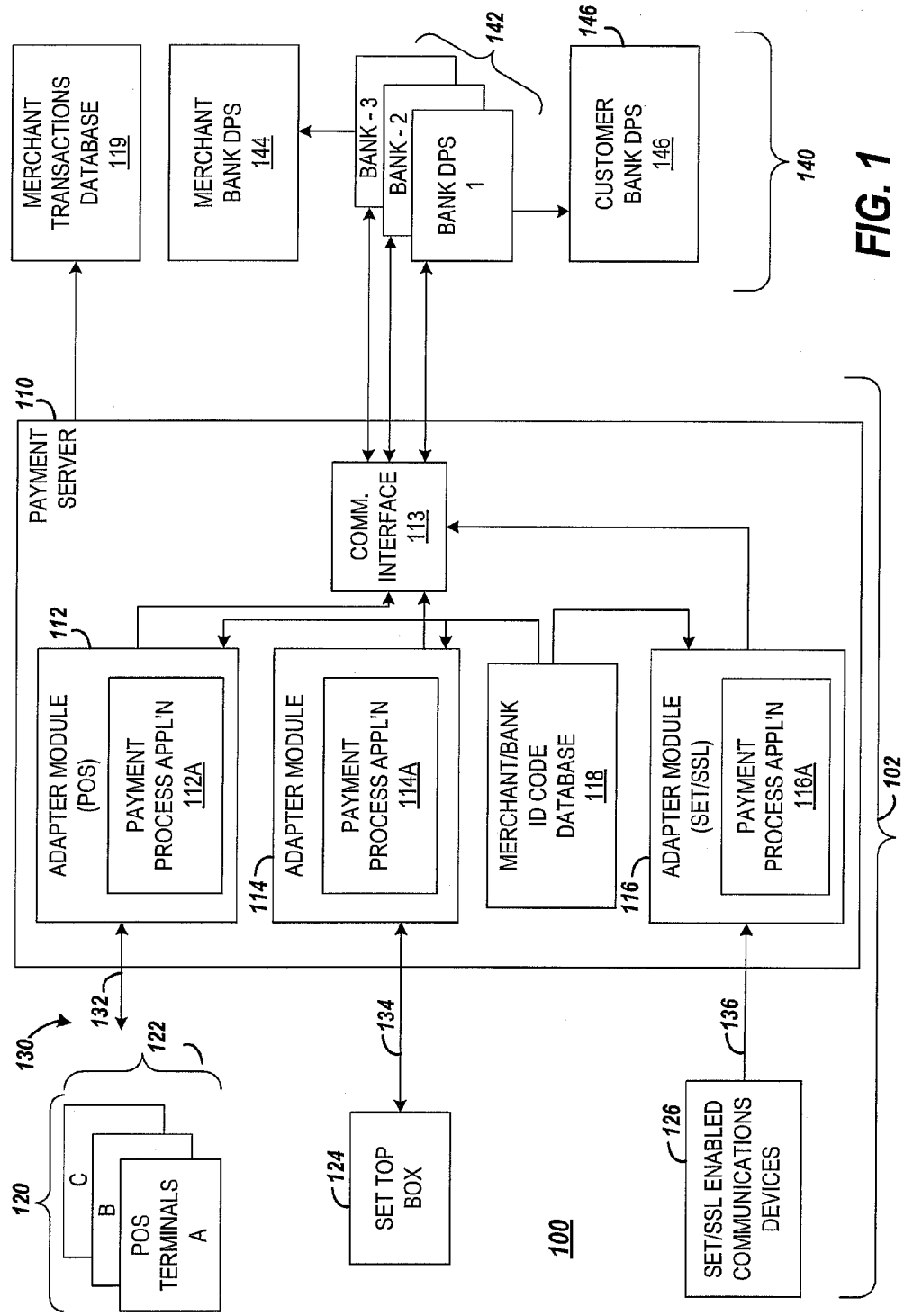
FIG. 1 is a diagram of a payment request processing system that incorporates a payment server arrangement in accordance with an example embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Various embodiments of the present invention are described in connection with providing payment-processing services to merchants for facilitating payments made by customers not using traditional POS terminals. In addition, an enhanced payment processing system of the present invention will facilitate the addition of new data communications devices that communicate via distinct protocols and communication channels without the need to reconfigure the entire payment processing system. For purposes of this application, data processing systems (DPS) include, but are not necessarily limited to, personal computers, internet appliances, e-Service related entities and objects, servers and workstations. Data communication devices include, but are not necessarily limited to, PDAs, mobile and WAP-enabled telephones and two-way pagers. Those skilled in the art will appreciate that the invention could be implemented in a variety of programming languages and hardware platforms.

In an example embodiment, a payment server serves as the front end of an electronic funds transfer point of sale (EFT-POS) system to process payments received from secured and unsecured data communication devices. For instance, a merchant subscribing to payment services provided by a CSP (Commerce Service Provider) can now offer his customers the convenience of paying for purchases via a mobile telephone (or a set top box) with the security of a POS terminal. A payment server managed by the CSP processes payment requests received via various channels each with a distinct protocol. In one example, a payment request received at the payment server from a customer's set top box is in a protocol selected by the cable service provider and is processed by an adapter module configured specifically for the selected protocol. In another example, payment requests received from SSL/SET enabled data communications devices are processed by another adapter module configured specifically for SSL/SET-based requests. The payment requests include a merchant identification code, a set of customer financial account data (e.g., credit card) and the purchase amount. In a related embodiment, the payment requests include a date and time and a purchase code. The payment server receives the payment request at one of a number of adapter modules that are each configured to respond to each protocol of each communications channel. Each of the adapter modules includes a payment processing application that identifies a financial institution identification code associated with the merchant identification code. The adapter modules interface with a data processing system of the financial institution (or bank) consistent with a communications protocol associated with the identified financial institution. Once the payment request is routed to the appropriate bank, than the request is handled as a normal ACH (automatic clearinghouse) transaction, which includes transferring funds from the credit card issuer to the merchant's bank.

Referring now to the figures, FIG. 1 illustrates a payment request processing clearinghouse system 100 that incorporates a payment server arrangement 110 in accordance with an example embodiment of the invention. In this example, system 100 includes a payment processing system 102 that is communicatively coupled to data processing systems of a financial clearinghouse network 140. In particular, system 102 includes payment server arrangement 110 that receives payment requests from a plurality of data communications 120 via various communications links 130 having respective communications protocols. Payment server arrangement 110 includes a plurality of adapter modules 112-116, a merchant/bank identification code database 118 and a communications interface 113. Each of the adapter modules includes a payment processing application configured to process payment requests received in a distinctive protocol.

Payment server 110 also includes a processor arrangement (not shown) that processes incoming signals as well as a memory arrangement (not shown) that stores the payment applications. Once the payment request is processed through the adapter modules the payment request is forwarded through interface 113 to banks 142. Banks 142 perform the traditional clearinghouse tasks through merchant bank DPS 144 and through customer bank DPS 146. In related embodiment, a merchant transactions database 119 is configured to receive and store historical (processed) payment data for later use in demographic research.

In this example embodiment, POS adapter module 112 of payment server 110 includes a payment processing application 112A that is configured to receive payment requests from customers at POS terminals 122 via communications link 132. POS terminals 122A-122C read a credit card (or a smart card or a chip card) tendered by the customer to effect a purchase payment and transmit a set of the customer-specific financial account data to adapter module 112. In one embodiment, POS terminal 122A is a thin client POS that does not include memory or a microprocessor. Terminal 122A relays the payment request data immediately to adapter module 112 of server 110 for processing the payment request. Adapter module 112 of server 110 takes control of the interactions between terminal 122A and server 110 by sending commands to terminal 122A to display data, to send data to a PIN PAD display (not shown), send data to a printer or send data to the chipcard. Data includes payment amount, retail location, merchant identification codes, personal identification numbers or other information that needs to be relayed to financial network 140. Adapter 112 communicates with terminal 122A until the payment request is complete before forwarding the request to financial network 140 for processing.

In another example embodiment, terminal 122B is a "FAT" client POS that includes processing and memory capabilities as well as an integrated modem and software. Terminal 122B incorporates multiple applications and shares processing duties with server 110. Thus, the payment processing request is completed at terminal 122B before the request is encrypted and forwarded to adapter module 112 for further processing. A communications link 132 between terminals 122 and server 110 could be wireless (wireless WAN or cellular) or a standard communications network (e.g., modem to PSTN or LAN).

In this example embodiment, server 110 also includes adapter module 114 and an adapter module 116 that are configured to communicate with a set top box and SSL/SET-enabled communications devices, respectively. Adapter module 114 receives a payment request from a customer's set top box 124 via cable or satellite link 134. Payment processing application 114A of adapter module 114 identifies the financial institution 142 associated with the merchant identification code using database 118. In this example, database 118 also includes a description of the communications protocol used by the financial institution for network communications. Application 114A converts the payment request to an electronic format that is suitable for processing by the data processing system of the identified financial institution.

Similar to adapter module 114, adapter module 116 receives a payment request from a customer's mobile telephone or PDA 126 (SSL/SET-enabled communications device) via a wireless communications link 136. In a related embodiment, adapter module 116 receives the payment request only after the customer enables a customer-controlled server (not shown) to send the customer financial account data. The customer-controlled server includes financial account data of the customer that is only made available to third parties upon the customer's request. Transactions processed through the customer-controlled financial server are configured to be more secure than sending the credit card information directly for payment processing. Merchants are encouraged to use more secure alternatives for receiving payments from customers by paying processing fees that are related to the level of security of the payment processing channel. The more secure the processing channel the lower the fee that the merchant is charged per transaction. In one example, the merchant is charged a 2% fee of the value of the customer purchase when the customer uses the POS terminal 122 versus 6% when the customer sends the credit card information over an unsecured data communications line. Since the customer-controlled financial server is considered highly secure, transactions processed therethrough will be at a lower cost to the merchant.

One of the advantages to server 110 is the ability to retrofit older EFTPOS systems with server 110 to automatically upgrade the entire payment processing system. Server 110 provides older systems with the capability of processing payments from different sources without compromising security. New applications are easily added to server 110 without having to make hardware adjustments/changes at any of the data communications devices 120.

Other data communications devices for effecting payments include vending machines or kiosks that are configurable to communicate as POS terminals or as SSL/SET-enabled devices. Once configured, the vending machine and the kiosk appear to server 110 as remote data communications devices and the server processes the payment requests as usual.

In another example embodiment, another entry point (not shown) to payment server 110 includes data communication devices used by small merchants that do not have a fixed POS terminal location but have their own authorization line with a financial institution. In this example, a small merchant or a taxi driver uses a thin POS device (e.g., mobile telephone) to enter the credit card number of the customer or passenger. In another example, the mobile telephone is WAP-enabled or utilizes the SMS (short message service) where he is operating in a GSM environment. The merchant then proceeds to send the financial account information along with his merchant identification code to server 110 for payment processing as described in the other related embodiments above.

In yet another example embodiment, another entry point (not shown) to payment server 110 for the customer includes, but is not necessarily limited to, a personal communications device (e.g., PDA) and a smart card enabled mobile telephone. With these data communications devices, the customer sends the financial account data (e.g., credit card number) with the merchant identification to server 110 for payment processing as described in connection with other related embodiments.

Figure 2:
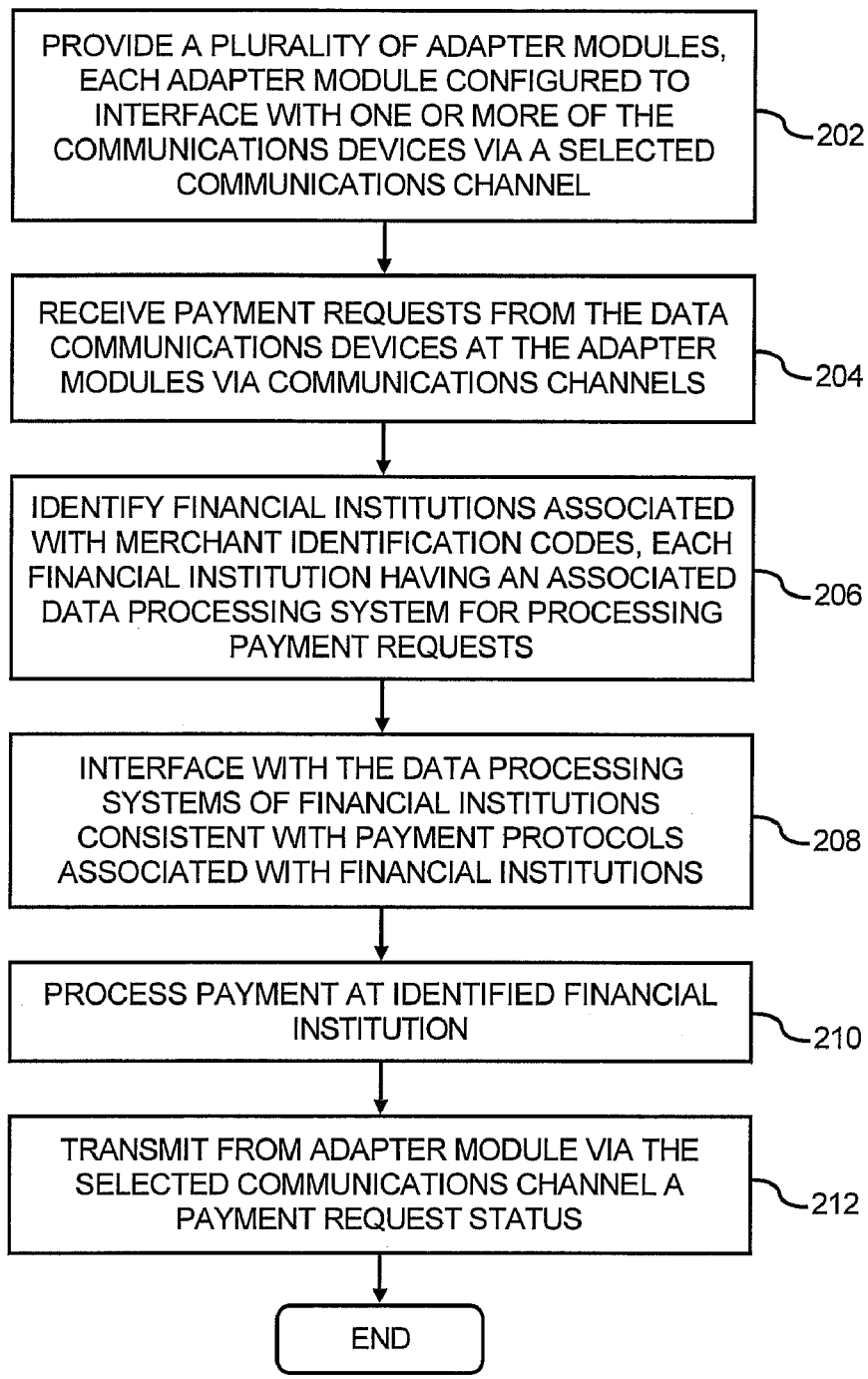
FIG. 2 is a flowchart illustrating the manner of processing payment requests from various secured and unsecured data communication devices in accordance with another example embodiment of the invention.

Referring now to FIG. 2, a flowchart 200 illustrates a computer-implemented method of processing payment requests from various secured and unsecured data communication devices in accordance with example embodiment of the invention. The payment requests include a merchant identification code and a set of customer financial data. In a related embodiment, time and date as well as a purchase code is included in the payment request. At step 202, the method includes providing a plurality of adapter modules 112-116 each of which is configured to interface with one or more of communications devices 120 via a selected communications channel (e.g., 132). At step 204, adapter modules 112-116 receive payment requests from data communications devices 120 via the communications channels 130. At step 206, the financial institutions 140 associated with the merchant identification codes are identified, with each financial institution having an associated data processing system for processing payment requests. At step 208, the method also includes interfacing with the data processing systems of the financial institutions 140 consistent with payment protocols associated with the financial institutions. At step 210, payment processing occurs at the identified financial institution. At step 212, adapter module transmits a payment request status via the selected communications channel to one of the data communications devices 130.

Various embodiments of the invention are believed to be applicable to a variety of payment request processing systems. The present invention has been found to be particularly applicable and beneficial in scenarios involving payment processing requests using personal communications devices owned by the customer. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A payment processing system comprising:
   a plurality of data communications devices transmitting a plurality of payment requests in connection with purchases, each data communications device transmitting the payment requests via a communication channel of one of a plurality of protocol types, wherein each protocol type is different from others of the plurality of protocol types and each payment request includes a merchant identification code and a set of customer financial account data; and
   a payment server including a database with a plurality of merchant identification codes, each merchant identification code associated with a financial institution identification code in the database, the payment server further including a plurality of adapter modules coupled to the database, each adapter module executable on the server, compatible with one of the plurality of protocol types, and coupled to a respective one of the communications channels, each adapter module adapted to receiving the payment requests from the data communications devices at the respective channel, each of the adapter modules having a payment processing application identifying from the database a financial institution identification code associated with the merchant identification code from a payment request and interfacing with a data processing system of a financial institution identified by the financial institution identification code consistent with a communications protocol associated with the identified financial account data to the identified financial institution for payment to a merchant identified by the merchant identification code.

2. The payment processing system of claim 1, wherein at least one of adapter modules is configured to communicate dam with a mobile communications device consistent with an secure socket layer secure electronic transaction communications protocol thereby ensuring a high level of security in communicating the customer financial account data.

3. The payment processing system of claim 2, wherein the at least one of the adapter modules configured to communicate with a mobile communications device is also configured to communicate data with a vending machine and a kiosk, thereby reducing the number of adapter modules dedicated to the data communications devices.

4. The payment processing system of claim 1, further comprising a customer financial server responsive to the mobile communications device and communicatively coupled to the payment server, the customer controlled server configured to transmit the set of customer financial account data at the high level of security sought by the financial institution.

5. The payment processing system or claim 1, wherein at least one of the adapter modules is configured to communicate data with an point of sale terminal consistent with a point of sale communications protocol thereby ensuring a high level of securing in communicating the customer financial account data.

6. The payment processing system of claim 1, wherein at least one of the adapter modules is configured to communicate data with a set top box arrangement consistent with a cable network communications protocol thereby ensuring a high level of securing in communicating the customer financial account data.

7. The payment processing system of claim 1, wherein at least one of the adapter modules is configured to communicate data with a set top box arrangement consistent with a satellite network communications protocol thereby ensuring a high level of securing in communicating the customer financial account data.

8. The payment processing system of claim 1, further comprising a merchant transactions database that includes historical information of payments processed by the payment server arrangement, wherein the historical information is configurable for demographic research.

9. A payment request processing arrangement configured and arranged for communication with a plurality of data communication devices and communication with a plurality of data processing systems located at a plurality of financial institutions, each data communication device configured to transmit a payment request via a communication channel of one of a plurality of protocol types, wherein each protocol type is different from others of the plurality of protocol types, the arrangement comprising:
   a payment server configured and arranged to be responsive to the plurality of data communications devices and including a database configured with a plurality of merchant identification codes, each merchant identification code associated with a financial institution identification code in the database, the payment sewer further including a plurality of adapter modules coupled to the database, each adapter module executable on the server, compatible with one of the plurality of protocol types, and coupled to a respective one of the communications channels, wherein each payment request includes a merchant identification code and a set of customer financial account data, each adapter module having a payment processing application configured to identify from the database a financial institution identification code associated with the merchant identification code from a payment request and interface with a data processing system of a financial institution identified by the financial institution identification code consistent with a communications protocol associated with the identified financial institution, and provide the merchant identification code and set of customer financial account data to the identified financial institution for payment to a merchant identified by the merchant identification code.

10. The arrangement of claim 9, further comprising a merchant transactions database that includes historical information of payments processed by the payment server arrangement, wherein the historical information is configurable for demographic research.

11. The arrangement of claim 9, wherein at least one of the adapter modules is configured to communicate data with a set top box arrangement consistent with a cable network communications protocol thereby ensuring a high level of securing in communicating the customer financial account data.

12. A system for processing payment requests from a plurality of data communications devices, each payment request including a merchant identification code and a set of customer financial data, the system comprising:
   a plurality of processor-executable adapter modules, each adapter module configured to interface with one or more of the communications devices via a selected one of a plurality of communications channels, wherein each communications channel is one of a plurality of protocol types, and each protocol type is different from others of the plurality of protocol types;
   means, such as a computer connected to a network, for receiving payment requests from the data communications devices at the adapter modules via the communications channels;

a database coupled to the adapter modules and configured with a plurality of merchant identification codes, each merchant identification code associated with a financial institution identification code in the database;

means, such as software running on a computer, for identifying from the database for each payment request, the financial institution code associated with the merchant identification code from the payment request, each financial institutions code identifying a financial institution having an associated data processing system for processing payment requests; and means, such as a network interface, for interfacing with the data processing systems of the financial institutions consistent with payment protocols associated with the financial institutions to provide the merchant identification codes and sets of customer financial account data to the identified financial institutions for payment to merchants identified by the merchant identification codes of payment requests.

13. A computer-implemented method for processing payment requests from a plurality of data communications devices, each payment request including a merchant identification code and a set of customer financial data, the method comprising:

providing a plurality of processor-executable adapter modules, each adapter module configured to interface with one or more of the communications devices via a selected one of a plurality of communications channels, wherein each communications channel is one of a plurality of protocol types, and each protocol type is different from others of the plurality of protocol types;

configuring a database coupled to the adapter modules with a plurality of merchant identification codes and financial institution identification codes, wherein each merchant identification code is associated with a financial institution identification code in the database;

receiving payment requests from the data communications devices at the adapter modules via the communications channels;

identifying, using the database for each payment request, the financial institution code associated with the merchant identification code, each financial institution identified by a financial institution code having an associated data processing system for processing payment requests; and interfacing, for each payment request, with the data processing system of the identified financial institution consistent with a payment protocol associated with the identified financial institution, and providing the merchant identification code and set of customer financial account data to the identified financial institution for payment to a merchant identified by the merchant identification code.

14. The method of claim 13, after the interfacing step, further comprising;

processing payment at the identified financial institutions; and storing the processed payment as data in a merchant transactions database.

15. The method of claim 13, wherein the step of identifying the financial institutions includes providing a merchant/bank identification database that includes historical information of processed payments, wherein the historical information is configurable for demographic research.

* * * * *

UNITED STATES PATENT AND TRADEMARK OFFICE
CERTIFICATE OF CORRECTION

| | | |
|---|---|---|
| PATENT NO. | : 7,428,507 B2 | Page 1 of 1 |
| APPLICATION NO. | : 09/896576 | |
| DATED | : September 23, 2008 | |
| INVENTOR(S) | : Jean-Marc Villaret et al. | |

It is certified that error appears in the above-identified patent and that said Letters Patent is hereby corrected as shown below:

In column 7, line 38, in Claim 2, delete "dam" and insert -- data --, therefor.

In column 7, line 54, in Claim 5, delete "or" and insert -- of --, therefor.

In column 8, line 24, in Claim 9, delete "sewer" and insert -- server --, therefor.

In column 8, line 64, in Claim 12, after "means" delete ", such as a computer connected to a network,".

In column 9, line 5, in Claim 12, after "means" delete ", such as software running on a computer,".

In column 9, line 12, in Claim 12, after "means" delete ", such as a network interface,".

In column 10, line 22, in Claim 14, delete "comprising;" and insert -- comprising: --, therefor.

Signed and Sealed this

Twenty-third Day of December, 2008

JON W. DUDAS
*Director of the United States Patent and Trademark Office*